United States Patent
Lebbos et al.

(10) Patent No.: US 11,896,044 B2
(45) Date of Patent: Feb. 13, 2024

(54) STARCH-BASED EDIBLE COATING COMPOSITIONS AND USES THEREOF

(71) Applicant: Startchy Inc., Murfreesboro, TN (US)

(72) Inventors: Richardos Simon Lebbos, Jbeil (LB); Kayssar Hadi Eid, Jounieh (LB); Seth Shumate, Murfreesboro, TN (US)

(73) Assignee: Startchy Inc., Murfreesboro, TN (US)

( * ) Notice: Subject to any disclaimer, the term of this patent is extended or adjusted under 35 U.S.C. 154(b) by 0 days.

(21) Appl. No.: 17/984,349

(22) Filed: Nov. 10, 2022

(65) Prior Publication Data

US 2023/0134284 A1 May 4, 2023

Related U.S. Application Data

(63) Continuation of application No. 16/857,714, filed on Apr. 24, 2020, now Pat. No. 11,497,236.

(60) Provisional application No. 62/903,541, filed on Sep. 20, 2019, provisional application No. 62/839,391, filed on Apr. 26, 2019.

(51) Int. Cl.
*A23P 20/10* (2016.01)
*A23L 29/212* (2016.01)
*A23L 33/105* (2016.01)

(52) U.S. Cl.
CPC .............. *A23P 20/10* (2016.08); *A23L 29/212* (2016.08); *A23L 33/105* (2016.08)

(58) Field of Classification Search
None
See application file for complete search history.

(56) References Cited

U.S. PATENT DOCUMENTS

| | | |
|---|---|---|
| 4,280,851 A | 7/1981 | Pitchon et al. |
| 4,487,786 A | 12/1984 | Junge |
| 6,617,446 B1 | 9/2003 | Papadopoulos et al. |
| 2003/0072731 A1 | 4/2003 | Gulian et al. |
| 2004/0121046 A1 | 6/2004 | Dihel et al. |
| 2016/0150810 A1 | 6/2016 | Hume et al. |
| 2017/0156356 A1 | 6/2017 | Omenetto et al. |
| 2017/0215445 A1 | 8/2017 | Nussinovitch et al. |
| 2017/0303575 A1 | 10/2017 | Girard |
| 2018/0125110 A1 | 5/2018 | Jin et al. |

FOREIGN PATENT DOCUMENTS

| | | |
|---|---|---|
| CA | 2998961 | 3/2017 |
| EP | 0480433 | 4/1992 |
| GB | 1448495 | 9/1976 |
| WO | 2007038621 | 4/2007 |

OTHER PUBLICATIONS

Fennema, "Fennema's Food Chemistry 4th Edition," CRC Press 2008, pp. 120-124.
Sapper et al., "Starch-Based Coatings for Preservation of Fruits and Vegetables," vol. 8, No. 152, Apr. 24, 2018, 19 pages.
International Search Report and Written Opinion, application No. PCT/US2020/029928, dated Jul. 24, 2020, 13 bages.
Das et al., "Development of a rice starch-based coating with antioxidant and microbe-barrier properties and study of its effect on tomatoes stored at room temperature," LWT-Food Science and Technology, vol. 50, No. 1, 2013, 7 pages.
Garcia et al., "Placticized Starch-Based Coatings to Improve Strawberry (Fragaria x Ananassa) Quality and Stability," Journal of Agricultural and Food Chemistry, American Chemical Society, Books and Journals Division, vol. 46, No. 9, Sep. 1, 1998, 10 pages.
Garcia et al., "Selection of an Edible Starch Coating for Minimally Processed Strawberry," Food and Bioprocess Technology, Dec. 2010, 10 pages.
Zarguili et al., "Influence of DIC hydrothermal process conditions on the gelatinization properties of standard maize starch," Journal of Food Engineering, 2006, 22 pages.
Warren et al., "Charcterizing the Hydrothermal Behavior of Starch with Dynamic Mechanical Analysis," PerkinElmer Inc., 2012, 5 pages.
Canada Patent Office, Office Action, Application No. 3,137,578, dated Jun. 29, 2023, 5 pages.

*Primary Examiner* — Jyoti Chawla
(74) *Attorney, Agent, or Firm* — McAndrews, Held & Malloy, Ltd.

(57) ABSTRACT

Starch-based edible coating compositions for preserving food products are disclosed. The starch-based coatings comprise both a polymerized starch, comprising intertwined amylopectin chains and/or amylose chains, and native (unmodified) and/or modified starch granules dispersed in a liquid carrier. When the starch granules are heated to a temperature to induce swelling, the swollen starch granules become embedded in the intertwined amylopectin and/or amylose chains, improving physical properties of the coating needed to extend shelf-life of food products. Also disclosed are coatings made from the coating compositions, methods of making the coatings, and methods of applying the coatings to food products.

17 Claims, 10 Drawing Sheets

STARCH-BASED EDIBLE COATING COMPOSITIONS AND USES THEREOF

CROSS REFERENCE TO RELATED APPLICATIONS

This application is a continuation of U.S. non-provisional application Ser. No. 16/857,714, filed Apr. 24, 2020, which claims priority to U.S. Provisional Application No. 62/903,541, filed Sep. 20, 2019, and U.S. Provisional Application No. 62/839,391, filed Apr. 26, 2019. The entire specifications of the provisional applications referred to above are hereby incorporated by reference

FIELD OF THE INVENTION

The present technology relates to edible coating compositions that are applied to food products to extend their shelf life. In particular, the present technology relates to starch-based coating compositions that comprise both a polymerized starch, and native (unmodified) and/or modified starch granules dispersed in a liquid carrier. The present technology also relates to coatings made from the coating compositions, methods of making the coatings, and methods of applying the coatings to food products.

BACKGROUND OF THE INVENTION

Coatings have been applied to food products for many years for a variety of reasons. For example, coatings have been used to extend the shelf life of the product, and/or to protect the food product from adverse environmental effects. Coatings have been applied to fruits and vegetables to control postharvest decay by reducing oxidation thereby retarding ripening, and by acting as a barrier to water loss from inside the fruit or vegetable.

Edible coatings provide a promising way to extend shelf life, and protect food quality and safety. An edible coating is a thin layer of material that is applied as a liquid solution or dispersion to the surface of a food product, and forms a coating on the surface when dried. The liquid solution or dispersion contains a polymer with film-forming properties. One of the widest used coatings in the food industry is wax. Typical waxes that can be eaten include carnauba wax, shellac, or a blend thereof. Wax coatings can effectively act as a moisture barrier, thereby retarding water loss and shrinkage, and also provide a gloss, thereby enhancing appearance. However, waxes typically do not prevent or retard ripening.

Other edible coatings have been formed from proteins, lipids, polysaccharides, or combinations of these. Although such coatings provide an improvement over wax coatings, they still suffer from one or more shortcomings. Protein-based coatings raise concerns regarding food allergies, since proteins often trigger allergic responses. Lipid coatings can provide good permeability but may also have poor mechanical properties, such as brittleness. Ideally, an edible coating would exhibit the following properties: provide a barrier to oxygen; provide a barrier to moisture loss; provide a barrier to other gasses, such as carbon dioxide and ethylene; be transparent, odorless, and tasteless; be made with food-safe ingredients; not promote bacterial or fungal growth; have resistance to humidity over a wide range of temperatures (0° C. to 50° C.) over a time greater than the commercial need of the particular food product; and provide glossiness (for some foods).

Starch is a polysaccharide having a number of desirable properties that make it a promising component for use in edible coatings. Starch-based coatings are transparent, odorless, and tasteless, and have good film-forming properties. Starch is also abundant and easily processed, making starch-based coatings less expensive than lipid or protein-based coatings. However, starch-based coatings normally exhibit low water vapor barrier capacity due to the hydrophilic nature of starch.

Starch exists in plants in the form of granules, and has a semi-crystalline structure comprised of amorphous and crystalline material. Starch granules contain two polymeric components: amylose and amylopectin. Amylose is an essentially linear polysaccharide having $\alpha$-(1-4) linked glucose chains, whereas amylopectin is a branched polysaccharide having $\alpha$-(1-4) linked glucose chains interspersed with $\alpha$-(1-6) branch points. The ratio of amylose to amylopectin in a starch varies depending on the type of starch. Typically, starch contains about 20% to about 25% amylose and about 75% to about 80% amylopectin by weight, although waxy starches, containing little or no amylose (99-100% amylopectin), and high amylose starches, containing at least 50% by weight amylose, are commercially available.

Hydrothermal processing, i.e. heat treatment of starch in the presence of water, has a significant effect on the physical characteristics of the starch. At temperatures of about 50° C. to about 75° C., starch granules go through a thermal transition, termed gelatinization, in which the starch granules become swollen. Heating to higher temperatures causes the swollen starch granules to further swell and rupture, forming "granule ghosts" (highly hydrated, amorphous remnants of starch granules) that leach amylose and amylopectin into the water or other carrier solution. Additional heating results in fully gelatinized starch composed of linear amylose chains and branched amylopectin chains. Upon cooling, the amylose chains and amylopectin chains intertwine, forming a gel network (gelation). Further cooling results in retrogradation, where the amylose chains fold in on themselves. This leads to detrimental physical properties for starch-based coatings, making large scale production and application of such coatings difficult for the purpose of coating food.

Typical prior art starch-based coatings employ a single phase of gelatinized starch. The starch-based coating compositions are prepared simply by mixing starch and water and heating the mixture to a temperature in the range of about 70° C. to about 121° C., depending upon the type of starch, to fully gelatinize the starch. See, e.g., Fakhouri, F. M.; Martelli, S. M; Caon, T.; Velasco, J. I., Mei, L. H. I., Edible films and coatings based on starch/gelatin: Film properties and effect of coating on quality of refrigerated red crimson grapes, Postharvest Biol. Technol. 2015, 109, 57-64; Das, D. K.; Dutta, H.; Mahanta, C. L., Development of a rice starch-based coating with antioxidant and microbe-barrier properties and study of its effect on tomatoes stored at room temperature, LWT Food Sci. Technol. 2013, 50, 272-278; and Garcia, L. C.; Pereira, L. M; de Luca Sarantopoulos, C. I. G.; Hubinger, M. D., Selection of an edible starch coating for minimally processed strawberry. Food Bioprocess Technol. 2010, 3, 834-842. An alternative to heat treatment is the addition of sodium hydroxide (NaOH) or other catalysts to the aqueous starch mixture to gelatinize the starch. See, Garcia, M. A.; Martino, M. N; Zaritzky, N. E., Plasticized starch-based coatings to improve strawberry (*Fragaria_ananassa*) quality and stability, J. Agric. Food Chem. 1998, 46, 3758-3767. Whether heat treatment or base treatment is used, the result is that a single phase of gelatinized starch is used in prior art starch-based coating compositions. The gelatinized starch is then applied to the fruit or vegetable to form an edible coating. Other components may be added to the starch-based coatings to improve properties.

One drawback of prior art starch-based coatings is that the change in properties as the starch transitions from gelatinization to retrogradation makes starch-based coatings difficult to use in large scale commercial applications. While prior art starch-based coatings have shown potential on a laboratory scale, little attention has been given to how to implement such coatings in commercial scale production. As a result, starch-based coatings have not been readily used in commercial applications.

There is still a need in the art for an edible coating that provides more of the ideal properties of a coating noted above. There is also a need for an edible coating that, is economical, and can be readily adapted for commercial implementation.

BRIEF SUMMARY OF THE INVENTION

The present technology utilizes starch in two different forms, a fully gelatinized starch, comprising intertwined amylopectin chains and/or amylose chains, and swollen (non-ruptured) starch granules, to form coatings that increase the shelf-life of food products. Utilizing starch in two different forms minimizes changes in properties due to retrogradation, enabling the coating compositions to be adapted for commercial applications.

Accordingly, in one aspect, the present technology is directed to a liquid coating composition for coating a food product, wherein the liquid coating composition comprises (a) a liquid carrier; (b) a polymerized starch comprising amylopectin chains and/or amylose chains dispersed in the liquid carrier; and (c) starch granules of at least one native starch, modified starch, or a combination thereof dispersed in the liquid carrier.

In a further aspect, the present technology is directed to an edible coating for a food product, wherein at least a portion of the food product is in contact with the coating, and the edible coating comprises (a) polymerized starch forming a matrix of amylopectin chains and/or amylose chains adhered to the food product; and (b) swollen starch granules embedded within the matrix.

In a still further aspect, the present technology is directed to a method of making a food product coating composition comprising the steps of: (1) heating a slurry comprising starch granules and water to a temperature in the range of 70° C. to 125° C. for a time sufficient to rupture the starch granules and form a polymerized starch comprising amylopectin chains and/or amylose chains dispersed in the water; and (2) adding starch granules to the polymerized starch and water to form the coating composition.

Another aspect of the present technology is a method of applying a coating composition to a food product, wherein the method comprises (a) providing a coating composition comprising (i) a liquid carrier; (ii) a polymerized starch comprising amylopectin chains and/or amylose chains dispersed in the liquid carrier and (iii) starch granules dispersed in the liquid carrier; (b) heating the coating composition to cause the starch granules to swell; (c) spraying the coating composition through a spray-coating nozzle onto at least a portion of the food product; and (d) at least partially drying the coating composition applied to the food product.

A further aspect of the present technology is a method of retarding the ripening of a fruit or vegetable comprising the steps of applying to at least a portion of the fruit or vegetable an effective amount of a coating composition comprising (i) a liquid carrier; (ii) a polymerized starch comprising amylopectin chains and/or amylose chains dispersed in the liquid carrier; and (iii) swollen starch granules dispersed in the liquid carrier; and at least partially drying the coating.

DETAILED DESCRIPTION

Figure 1:
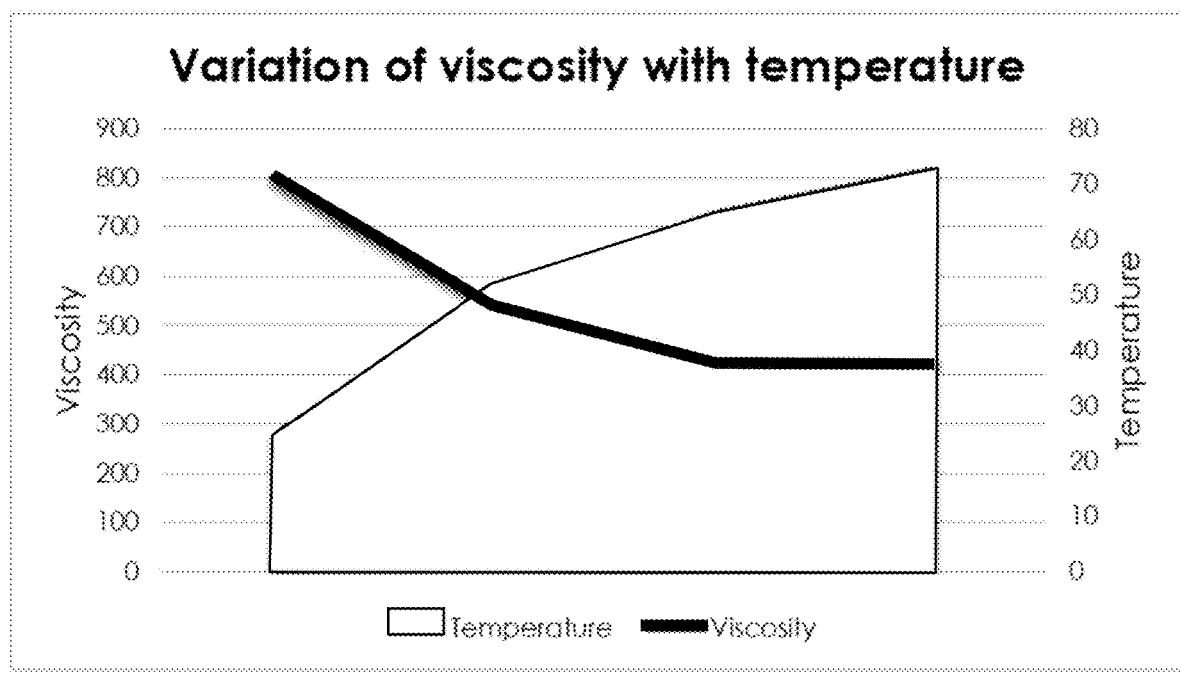
FIG. 1 is a graph showing the effect of temperature on the viscosity of a coating composition according to the present technology.

The presently described starch-based edible coating compositions comprise two forms or phases of starch: fully ruptured starch granules and starch granules that, upon heating, become swollen (pre-ruptured).

As used herein, the term "native starch" refers to a starch extracted from a starch-bearing crop in its natural form, and has not been chemically, enzymatically, and/or physically modified. Native starch may include starch derived from a genetically modified source.

As defined herein, "modified starch" refers to a native starch that has been altered from its natural form by chemical, enzymatical and/or physical treatment of the starch.

As used herein, "polymerized starch" refers to starch that has been heated to a temperature sufficient to rupture the starch granules, causing the amylopectin chains and/or amylose chains to be released from the granules.

As used herein, "starch granules" refers to starch that is in granular form, without any heat treatment. Starch granules can be of a native starch or a modified starch.

As used herein, "swollen starch granules" refers to starch that has been heated to a temperature at which the starch granules become swollen by incorporation of water and other ingredients into its semi-crystalline structure, but not ruptured.

As used herein, an "effective amount" or "sufficient amount" means an amount that is capable of performing the function for which the effective amount or sufficient amount is expressed. The exact amount required will vary depending on the particular compound, formulation, and/or processing conditions employed.

As used herein, a "food product" refers to any food intended to be consumed by a human or animal. Food products include, but are not limited to, fruits and vegetables, whether whole or prepared, such as by peeling, slicing, cutting, or shredding, meat products, including beef, pork, poultry, fish, and seafood, or combinations thereof, whether fresh, frozen, pre-cooked, or ready to eat, or baked products, such as cookies, crackers, snack cakes, and breads. Food products also include pet foods, including, but not limited to, kibble or dry food, semi-moist food, raw food, and pet chews.

Coating Compositions

In general, starches that may be used to prepare the coating compositions of the present technology may be any type of plant-derived starch. Examples of starches include, but are not limited to, starches derived from corn, rice, wheat, potato, cassava, and pea. Blends of different starches may also be used, such as when the starches have different properties important for the film or coating. The starch can be a native starch (unmodified), a modified starch, or a combination thereof. The starches can have a wide range of amylose to amylopectin ratios, with an amount of amylose ranging from 1% to 99% by weight, and the amount of amylopectin ranging from 1% to 99% by weight, based on the weight of the starch. In some embodiments, the starch can have an amount of less than 1% or 0% amylose and greater than 99% or 100% amylopectin by weight, based on the weight of the starch. In other embodiments, the starch can have an amount of greater than 99% or 100% amylose and less than 1% or 0% amylopectin by weight, based on the weight of the starch.

Unlike the prior art, the coating compositions of the present technology comprise starch in two different forms or phases. One form of starch is a polymerized starch, comprising intertwined amylopectin chains and/or amylose chains. The second form of starch is starch granules which, upon heating to a temperature below the full gelatinization temperature of the starch, become swollen but not ruptured. The two forms of starch are combined to form the coating composition which, when dried, comprises swollen starch granules embedded within a polymerized starch matrix.

The polymerized starch is prepared by dispersing starch granules of at least one starch (native and/or modified) in a liquid carrier to form a slurry, and heating the starch slurry to a temperature sufficient to rupture the starch granules. Any suitable mixing equipment may be used to disperse the starch in the carrier to form the slurry. Typically the starch carrier will be water, although other carriers are also contemplated. A mixture of water and another carrier may also be used. The amount of starch in the slurry can range from about 0.5% to about 90%, alternatively about 1% to about 90%, alternatively about 2.5% to about 90%, alternatively about 5% to about 90% by weight, and the amount of carrier can range from about 10% to about 99.5%, alternatively about 10% to about 99%, alternatively about 10% to about 97.5%, alternatively about 10% to about 95% by weight, based on the total weight of the slurry.

After mixing, the slurry is heated to a temperature sufficient to rupture the starch granules. This heating temperature will vary depending on the type of starch, since the gelatinization temperature varies with starch type. In general, a sufficient heating temperature may be in the range of about 70° C. to about 125° C. Alternatively, the heating temperature can range from about 70° C. to about 115° C., alternatively about 70° C. to about 110° C., alternatively about 70° C. to about 105° C., alternatively about 70° C. to about 100° C., alternatively about 70° C. to about 95° C. In some embodiments, the heating temperature can range from about 80° C. to about 110° C., alternatively about 90° C. to about 110° C. In some embodiments, the heating temperature may be about 80° C., alternatively about 90° C., alternatively about 95° C., alternatively about 100° C., alternatively about 105° C. The heating is done over a time period sufficient to allow the amylose and amylopectin chains to be released from the ruptured granules and form a network of intertwined amylose and amylopectin chains. A sufficient time will depend on the type of starch and heating temperature, but in general, heating times can range from about 5 minutes to about 30 minutes, or more. In some embodiments, the heating can be done gradually, at a constant increase in temperature. Alternatively, the heating can be done in a step-wise fashion, in which the slurry is heated to a particular temperature, such as 80° C., and held at that temperature for a particular amount of time, such as 10 minutes, and then heated to a second, higher temperature, such as 100° C., and held at that temperature until the starch granules rupture and the released amylose and amylopectin chains form a network. Pressure may also be applied during the heating. In one embodiment, the starch granules are gradually heated to a temperature of about 105° C. and maintained at that temperature for about 15 minutes. The polymerized starch is allowed to cool to about 70° C., which limits retrogradation of the amylose chains. The result is a stable suspension of the polymerized starch dispersed in the liquid carrier.

Although heating is a preferred method for obtaining the polymerized starch, it is also contemplated that chemical treatment could be used to form the polymerized starch. For example, sodium hydroxide (NaOH), or other base, can be added to the starch slurry in an amount sufficient to rupture the starch granules without applying heat.

In addition to the starch and carrier, the starch slurry can include additional components to achieve different effects and properties. Such additional components can include, but are not limited to, plasticizers, cross-linking agents, or combinations thereof. Other components, such as surfactants, emulsifiers, stabilizers, anti-oxidants, or combinations thereof can also be included. Plasticizers promote plasticity and flexibility, and reduce brittleness. Typically, plasticizers form hydrogen or electrostatic bonds with the starch molecules. Examples of plasticizers that could be used include glycerin, sorbitol, polyethylene glycols, propylene glycol, and aloe vera gel. Combinations of different plasticizers may also be used. Plasticizer amounts can range from 0% to about 30%, alternatively about 1% to about 20%, alternatively about 1% to about 15%, alternatively about 1% to about 10%, alternatively about 1% to about 5% by weight, based on the weight of the starch slurry.

Cross-linking agents join polysaccharide (amylose and amylopectin) molecules together, resulting in a cross-linked starch that has higher tensile strength and decreased water permeability. Cross-linking agents that can be used include, but are not limited to, citric acid and phosphorous oxychloride. Combinations of cross-linking agents may also be used. The amount of cross-linking agent in the starch slurry can range from 0% to about 25%, alternatively about 1% to about 20%, alternatively about 1% to about 15%, alternatively about 1% to about 10%, alternatively about 1% to about 5% by weight, based on the weight of the starch slurry.

Citric acid is a preferred cross-linking agent since it is 100% natural and a "green" ingredient. Citric acid may also contribute food preservation properties to the coating and help to prevent food degradation. In addition, a citric acid cross-linking agent plays a role in the hydrolysis of hydrogen bonds between polysaccharides to facilitate gelatinization and allow water molecules to enter the granules.

The additional components can be mixed with the starch granules and carrier before the heating step, i.e. prior to polymerization of the starch granules, during the heating step, during the cooling step after heating, or alternatively both before the heating step, and during either or both of the heating and cooling steps. In some embodiments, citric acid is mixed with the starch granules and liquid carrier before heating to cross-link the starch molecules, and is also added after gelatinization, during cooling. Adding citric acid during the cooling allows infiltration of the citric acid into the polymerized starch network and bonding of the citric acid to any amylose chains not previously cross-linked. The citric acid also remains available to bond to the starch granules once they are mixed with the polymerized starch, thereby helping to maintain the starch granules in the polymerized starch network.

The second form of starch, the starch granules, may be the same type of starch as the polymerized starch or a different type of starch, and may be native starch, modified starch, or a combination thereof. The starch granules may also be a mixture of starches from different sources. The particle size of the starch granules can range from about 1 micron to about 100 microns.

The starch granules are mixed with the suspension of polymerized starch and carrier to form the coating compositions. In some embodiments, the starch granules are mixed and dispersed, as is, with the polymerized starch. The mixture of starch granules and polymerized starch is then heated to a temperature sufficient to cause the starch granules to swell but not rupture, and become embedded in the network of amylose chains and amylopectin chains of the polymerized starch. In other embodiments, the starch granules may be heated to a temperature sufficient to cause the starch granules to swell, and the swollen starch granules are then mixed with the polymerized starch to embed the swollen granules in the amylose and amylopectin chains of the polymerized starch. When the starch granules are heated and swollen prior to mixing with the polymerized starch, it is desirable to mix the starch granules with a liquid for the heating step. A sufficient heating temperature to cause the starch granules to swell is generally in the range of about 45° C. to about 85° C. The heating time will vary depending, at least in part, on the type of starch and the heating temperature, but in general, the heating time ranges from about 5 minutes to about 15 minutes. Any suitable mixing equipment may be used to mix and disperse the starch granules (either as is or swollen) in the suspension of polymerized starch and carrier. The amount of starch granules mixed with the polymerized starch can be from about 0.1% to about 10% by weight, based on the total weight of the coating composition.

Additional components can also be added to the starch granules prior to mixing the starch granules with the suspension of polymerized starch and carrier. Such additional components can include, but are not limited to, glycerin, anti-oxidation agents, anti-microbial agents, or combinations thereof. Anti-oxidation or anti-microbial agents can include, but are not limited to, essential oils, such as cinnamon, vanillin, lemongrass, or thyme, and plant extracts, such as aloe vera gel. Adding glycerin to the starch granules helps to strengthen the starch granules.

The resulting coating composition comprises from about 1% to about 20% by weight polymerized starch, from about 0.1% to about 10% by weight starch granules, and about 70% to about 97.5% by weight carrier and other ingredients, based on the total weight of the coating composition.

Additional ingredients may optionally be included in the final coating composition to achieve different effects. For example, surfactants, emulsifiers, stabilizers, and/or additional plasticizers can be added to improve the stability of the starch suspension or the physical properties of the coating during spraying, drying, or in storage on food. Examples of suitable surfactants or emulsifiers include non-ionic surfactants, such as polysorbates (Tween 20 and Tween 80) and polyglucosides, and lecithin. Anti-microbials and anti-oxidants, such as essential oils, can be added to further enhance the preservation properties of the coating compositions, and anti-oxidants can be added to reduce browning. Pigments may also be added to the coating compositions. Combinations of any of the foregoing ingredients may be used. When present, the additional ingredients can comprise from about 1% to about 30% by weight of the coating composition.

Application Methods

The coating composition can be applied to the food product using a variety of methods known in the art. Such methods include, but are not limited to, dip-coating, spray-coating, and brushing. In one embodiment, a coating composition comprising a matrix of polymerized starch and non-swollen starch granules dispersed in the carrier is applied by spray-coating. This method is particularly suitable for coating fruits and vegetables, although the method may be useful for other food products. In this embodiment, the coating composition is introduced into a spray-coating system in which the coating composition is heated by a heating source or mechanism, pumped to a spray nozzle, and sprayed through the spray nozzle to apply the coating to the food product, such as fruits or vegetables. The heating source or mechanism supplies sufficient heat to cause the starch granules to swell, but does not affect the polymerized starch network. The heating can take place in the container holding the coating composition to be sprayed, in-line before or after the pump, or in a manifold where the coating composition enters the spray nozzle. By the time the spray-coated coating composition reaches the surface of the fruit or vegetable, the starch granules are swollen and embedded in the polymerized starch network. The coating composition is then dried, forming a coating on the surface of the fruit or vegetable. Drying can be accomplished by air-drying or forced air drying. Alternatively, drying tunnels could be employed in which heated air up to 70° C. is used to dry the coating. One advantage of using spray-coating for applying the coating composition is that it can be adapted for commercial high-throughput food processing.

The dried coating of the present technology comprises the polymerized starch forming a polymerized starch matrix in which the swollen starch granules are imbedded. The swollen starch granules can comprise from about 5% to about 50% by weight of the dried coating, the polymerized starch can comprise from about 30% to about 95% by weight of the dried coating, and additional components, such as surfactants, stabilizers, anti-oxidants, pigments, or combinations thereof, can comprise from 0% to about 30% by weight of the coating. The thickness of the dried coating will depend, in part, on the substrate to be coated, but in general can be about 10 to about 25 microns.

Without wishing to be bound by any theory, it is believed that the swollen starch granules fill in gaps within the polymerized starch matrix, resulting in a coating having excellent tensile strength that reduces water vapor permeability and oxygen permeability.

The coatings of the present technology can be applied to a wide variety of food products. For example, the coatings can be applied to fruits and vegetables, such as, but not limited to, apples, pears, avocados, mangos, papayas, plums, and bananas. The coatings are effective for delaying the ripening process and extending the shelf-life of fruits or vegetables. The term "shelf life" means the duration of time that a food may be stored without becoming unfit for use or consumption. Shelf-life is therefore the maximum time for which a food product can be stored under expected or specified conditions. The term "extending the shelf-life" means that the coating prolongs the shelf-life compared to a product without the coating when both products are processed and stored under identical or substantially identical conditions. In some embodiments, the coatings of the present technology can extend the shelf-life of a food product by 2-3 times.

In some embodiments, the coatings of the present technology can be applied to animal food, such as pet kibble. Pet food can suffer from moisture migration between kibble of different water contents and also from lipid oxidation causing rancidity. These issues are usually solved by specifying a shorter shelf-life for the products so they are consumed before moisture migration occurs, and using synthetic antioxidants to reduce lipid oxidation rancidity. The pet food industry is moving away from synthetic ingredients, but such synthetic antioxidants are being phased out without a suitable alternative. More expensive packaging, such as heavy plastics, can aid in reducing lipid oxidation rancidity. However, European markets are moving away from single-use plastics, and each company has their own sustainability goals. Embodiments of the coatings of the present technology are able to address these issues.

Some embodiments of the coatings can block oxygen permeation on a level equivalent to ethylene vinyl alcohol (EVOH), a plastic resin commonly used as an oxygen barrier in food packaging, while also slowing the rate of moisture loss by about 90%. Coatings of the present technology can also provide additional benefits to animal food products. Some embodiments of the coatings can provide gloss, which gives the kibble a juicy appearance, and can provide structural stability, decreasing crumb flaking by about 65%. In some embodiments, the coating may enable the use of natural color ingredients instead of synthetic pigments or colorants by extending the useful life of these natural color ingredients.

The presently described technology and its advantages will be better understood by reference to the following examples. These examples are provided to describe specific embodiments of the present technology. Those with ordinary skill in the art will appreciate that various modifications and alternatives could be developed in light of the overall teachings of the disclosure. Accordingly, the particular arrangements and examples disclosed are meant to be illustrative only and not limiting as to the scope of the invention, which is to be given the full breadth of the appended claims, and any and all equivalents thereof. Unless otherwise defined, all technical and scientific terms used herein have the same meaning as commonly understood by one of ordinary skill in the art to which this invention pertains.

EXAMPLES

Example 1: Preparation of Coating Composition

A coating composition in accordance with the present technology was prepared by forming a Solution A, containing the polymerized starch, and a Solution B, containing the starch granules, and combining the two solutions to form the coating composition. Solution A was prepared by mixing the ingredients in Table 1 in a container, and heating the solution to a temperature of 100° C.

TABLE 1

| Solution A (200 mL) | |
| --- | --- |
| Starch | 16 g |
| Lemon juice | 16 mL |
| Glycerol | 10 mL |
| Water | 200 mL |

The solution was allowed to cool to a temperature of 80° C., at which point an additional 10 mL of lemon juice (citric acid) was added. The solution was then allowed to cool to 70° C., at which point 10 mL of aloe vera gel was added. The resulting solution is Solution A.

Solution B, containing the starch granules, was prepared by mixing the ingredients in Table 2 in a container, and heating the solution to a temperature of 70° C. The resulting solution is Solution B.

TABLE 2

| Solution B (100 mL) | |
| --- | --- |
| Starch | 4 g |
| Cinnamon | 70 mL |
| Glycerol | 10 mL |
| Aloe Vera | 20 mL |

40 mL of the heated Solution B was combined and mixed with Solution A to form the coating composition.

Example 2: Viscosity Testing

The viscosity of the coating composition from Example 1 was measured at the time of preparation and again after 24 hours, keeping the coating composition exposed to the environment. At the 24 hour period, samples of the coating composition were reheated to different temperatures to determine the effect of temperature on the viscosity. The results are shown in Table 3, and illustrated graphically in FIG. 1.

TABLE 3

| | | After 24 hours | | | |
| --- | --- | --- | --- | --- | --- |
| Sample | Preparation Day | 1 | 2 | 3 | 4 |
| RPM | 60 | 60 | 60 | 60 | 60 |
| Temperature (° C.) | 45 | 25 | 51.6 | 65.2 | 73.1 |
| Viscosity (cP) | 41 | 800 | 540 | 426 | 425 |

The results in Table 3 and FIG. 1 demonstrate that the viscosity of the coating composition can be reduced by increasing the reheating temperature.

Example 3: Macroscopic and Microscopic Evaluation of the Dried Coating

Figure 2:
FIG. 2 is a photograph showing the appearance of a dried coating composition of the present technology applied by spreading.
Figure 3:
FIG. 3 is a photograph showing the appearance of a dried coating composition of the present technology applied by brushing.
Figure 4:
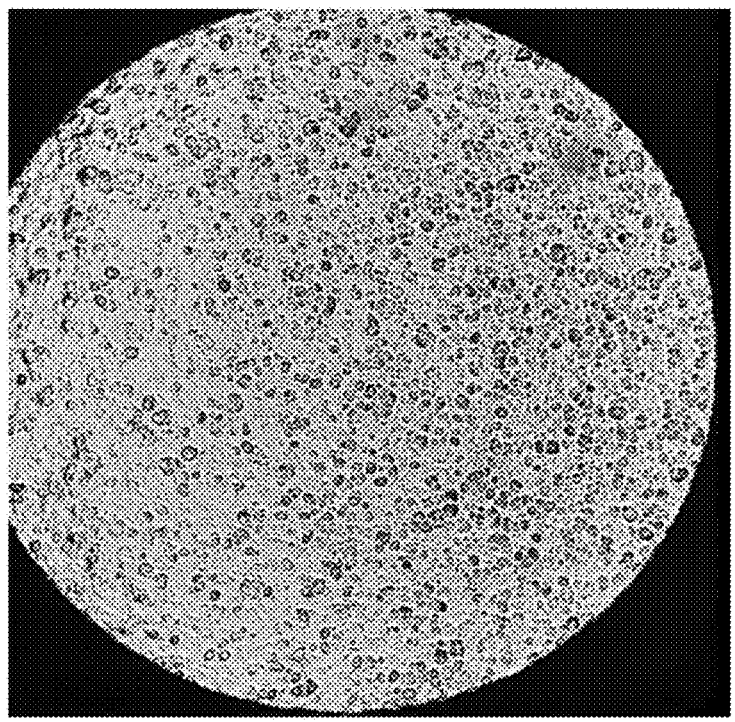
FIG. 4 is a photograph showing the microscopic structure of the dried coating composition applied by spreading.
Figure 5:
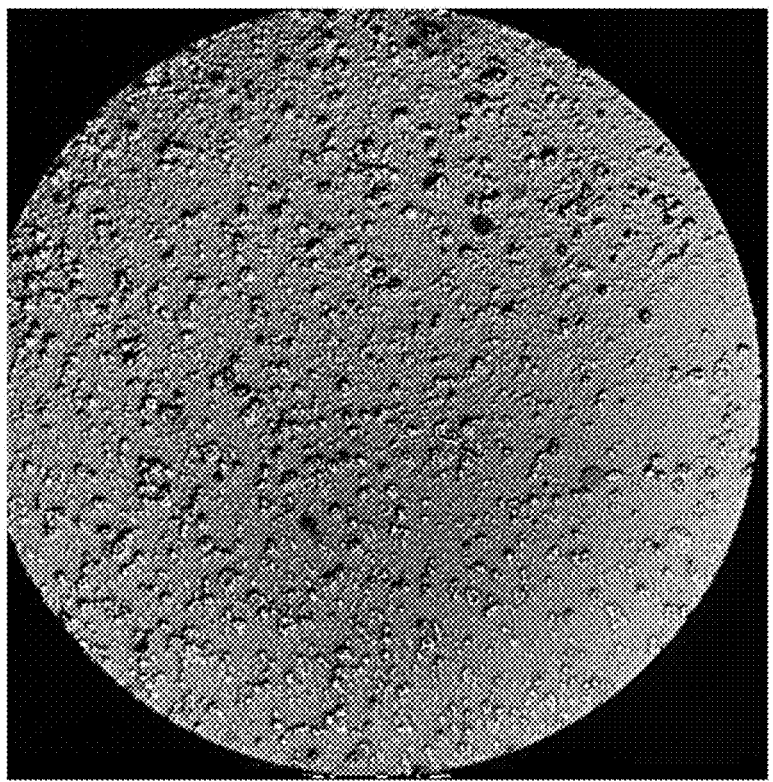
FIG. 5 is a photograph showing the microscopic structure of the dried coating composition applied by brushing.

The coating composition from Example 1 was heated to 70° C. and applied to a first petri dish by spreading, and to a second petri dish by brushing, and the coatings were allowed to dry. The dried coating applied by spreading resulted in a plastic, not sticky layer that could not be easily peeled, as shown in FIG. 2. The dried coating applied by brushing resulted in a slightly sticky, easily peeled layer, as shown in FIG. 3. The layer was still filmogenic due to brushing. The microscopic appearance of the coating applied by spreading and the coating applied by brushing can be seen in FIGS. 4 and 5, respectively. Although the coating applied by spreading appears smooth (FIG. 4), while the coating applied by brushing appears rougher (FIG. 5), both Figures show the swollen starch granules distributed within the polymerized starch network.

Example 4: Starch Coating Comparative Testing

Figure 6:
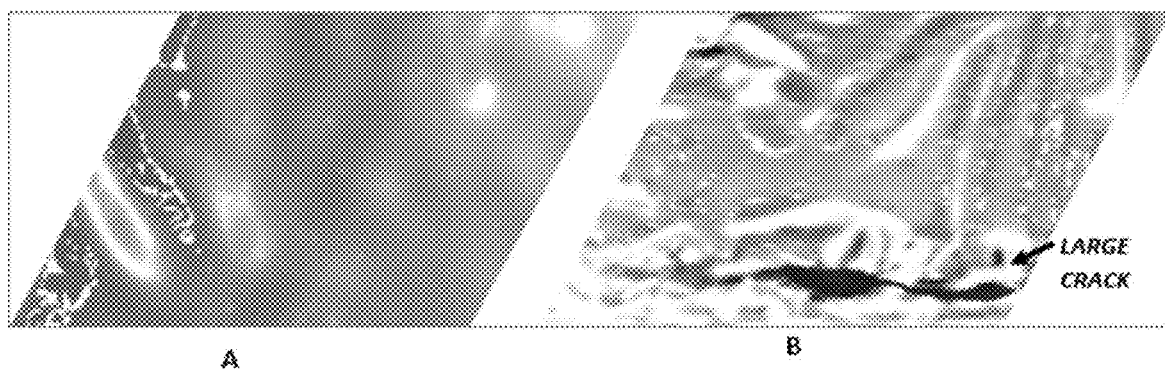
FIG. 6 shows a photograph (A) of a dried coating of the present technology after 24 hours of storage at 4° C., and (B) a comparative starch coating after 24 hours of storage at 4° C.

In this example, a starch coating prepared according to Example 1 was compared to similar starch coating compositions prepared using processing methods described in the prior art. For Comparative Process 1, the coating components were combined with water to form a solution, which was then heated to a temperature of 75° C. to form the coating composition. Heating to a temperature of 75° C. caused the starch granules to become swollen, but not ruptured. For Comparative Process 2, the coating components were combined with water to form a solution, which was then heated to a temperature of 100° C. Heating to a temperature of 100° C. caused the starch granules to become fully ruptured. Each of the coating compositions was applied to a petri dish and allowed to dry, forming a coating film. The films were placed in cold storage at 4° C. and 95% relative humidity to simulate storage conditions commonly used by the food industry for apples. After 24 hours in cold storage (4° C.), the films were removed and examined. A photograph (A) of the coating film of the present technology is shown in FIG. 6. The photograph shows the presence of starch granules in the film, with good uniformity and smooth texture. The coating film also adhered to the surface of the petri dish without delamination. A photograph (B) of the coating film prepared by Comparative Process 2 is also shown in FIG. 6. Photograph (B) of FIG. 6 shows that starch granules are absent from the coating. The photograph also shows that the coating developed buckling and cracking on the surface, which can lead to delamination of the coating from the surface.

Figure 7:
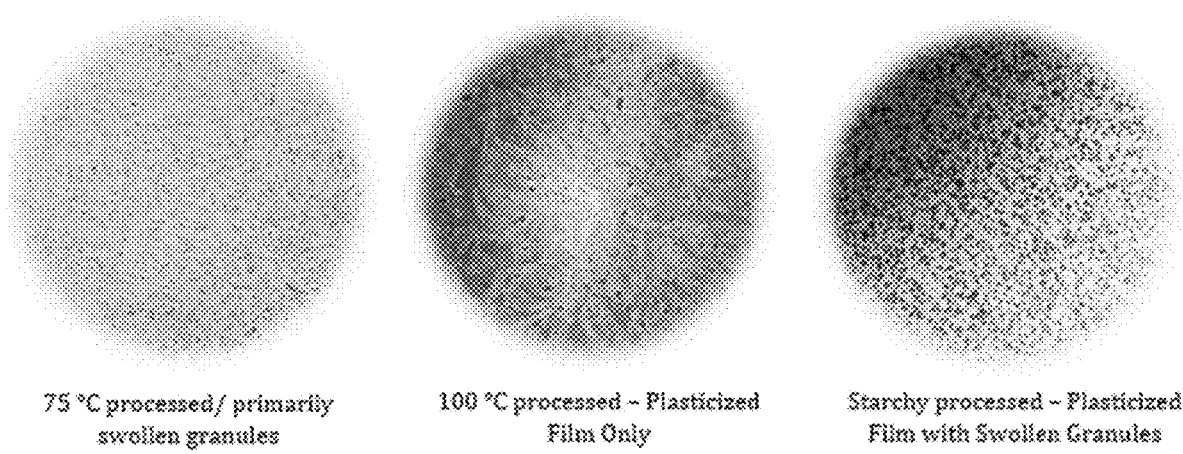
FIG. 7 shows photographs of the microscopic structures of a comparative starch coating processed at 75° C., a comparative starch coating processed at 100° C., and a dried starch coating composition of the present technology.
Figure 8:
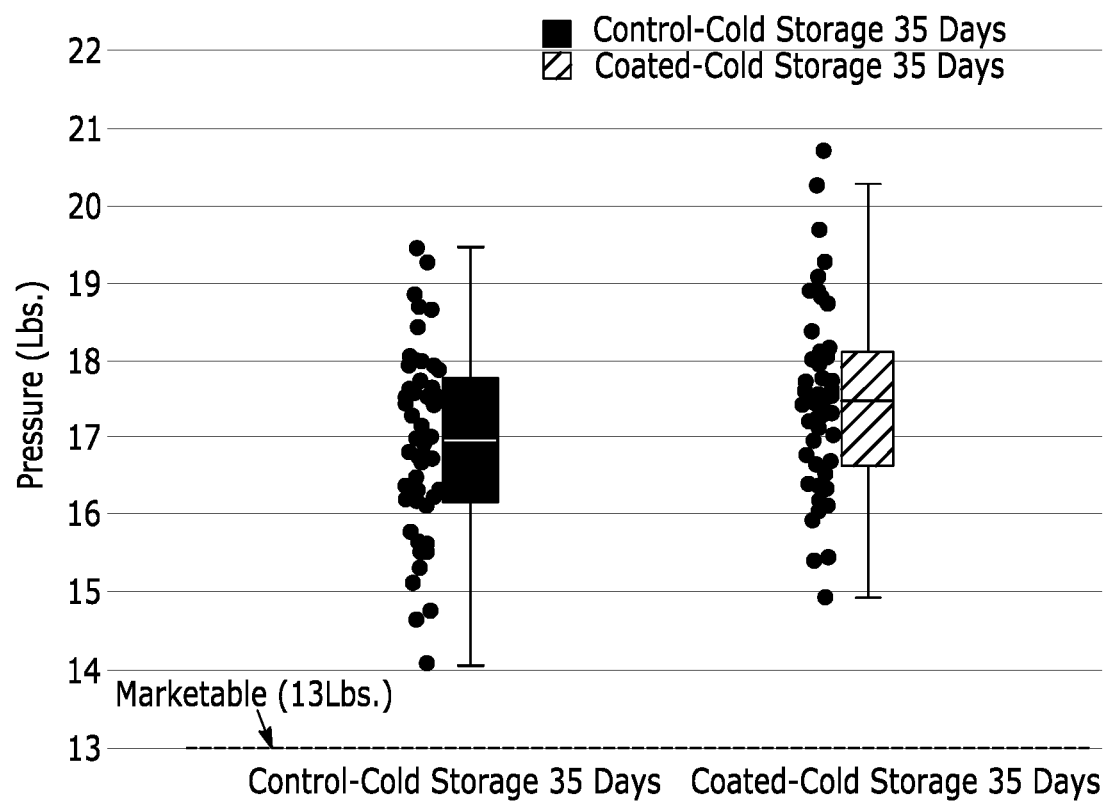
FIG. 8 is a graph comparing the firmness of test and control apples after 35 days of cold storage.
Figure 9:
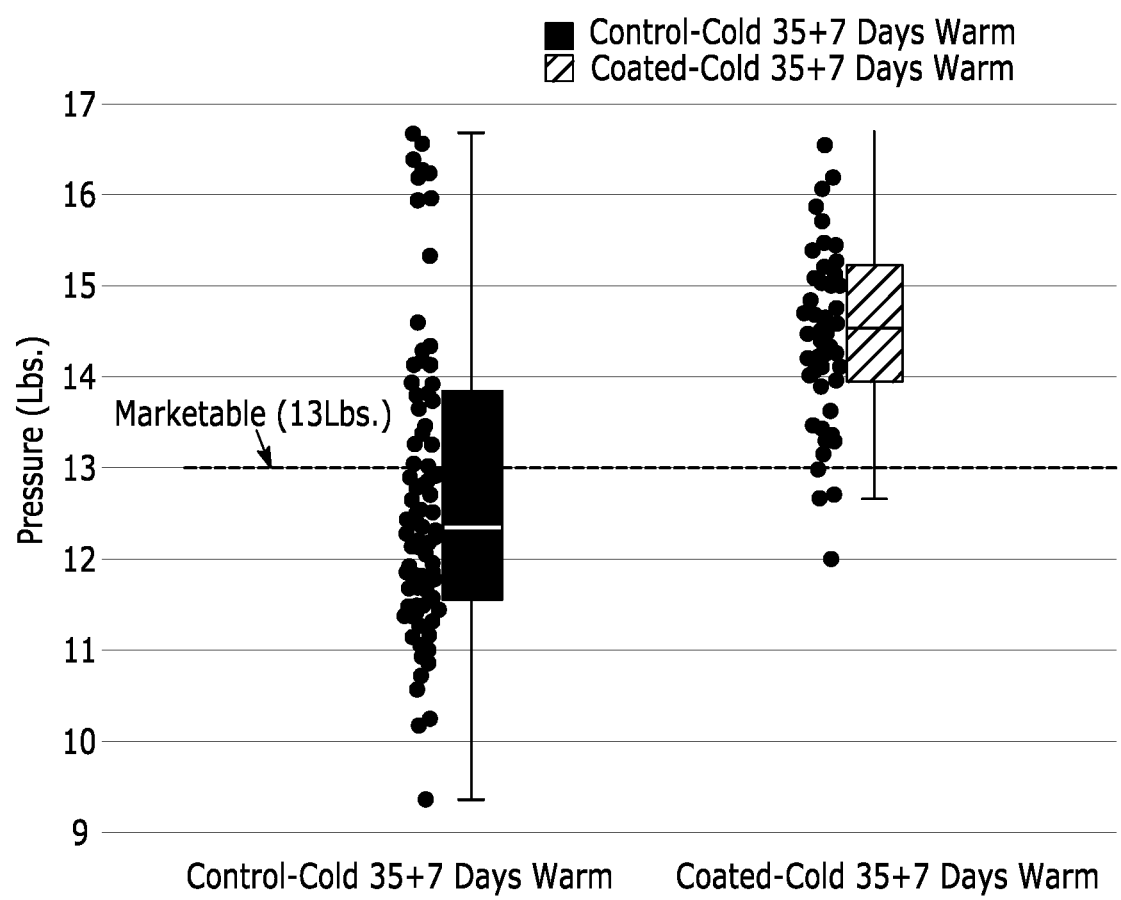
FIG. 9 is a graph comparing the firmness of test and control apples after 35 days of cold storage plus 7 days of ambient storage.
Figure 10:
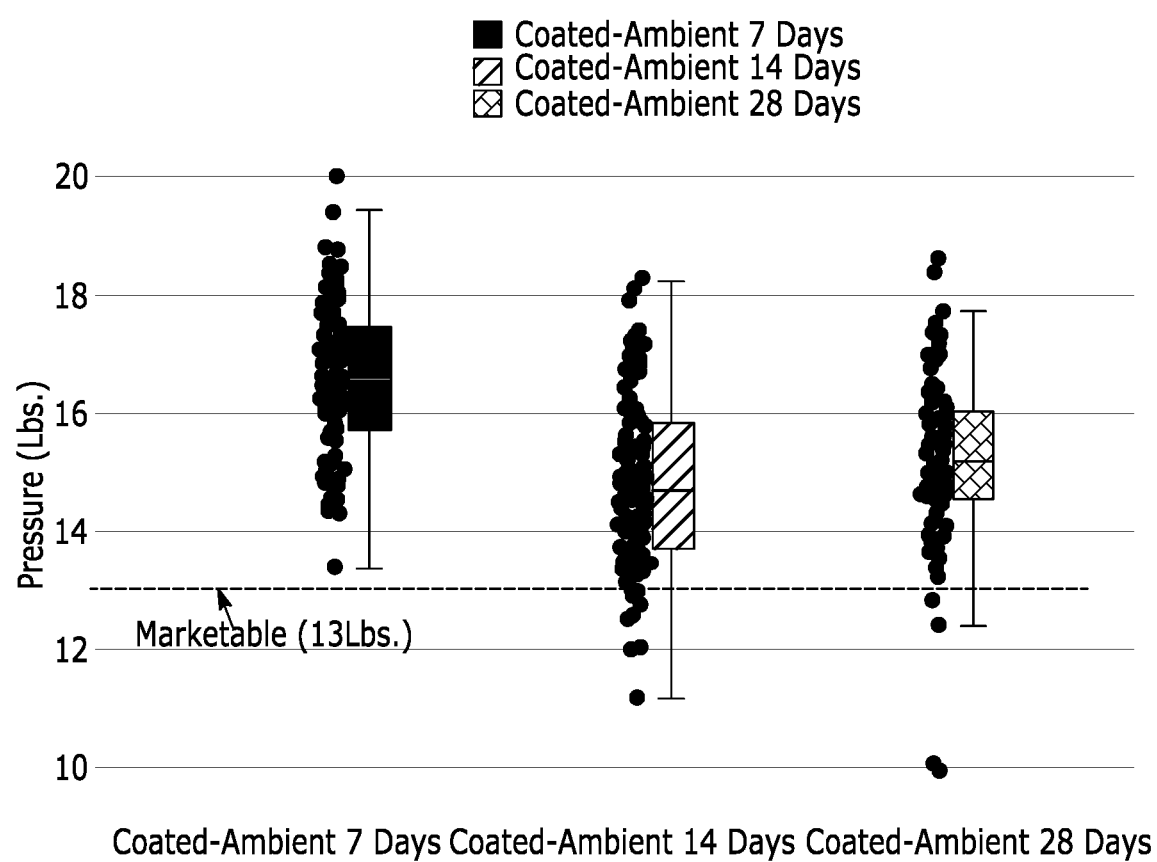
FIG. 10 shows the firmness of test apples after 7, 14, and 28 days at ambient temperature.
Figure 11:
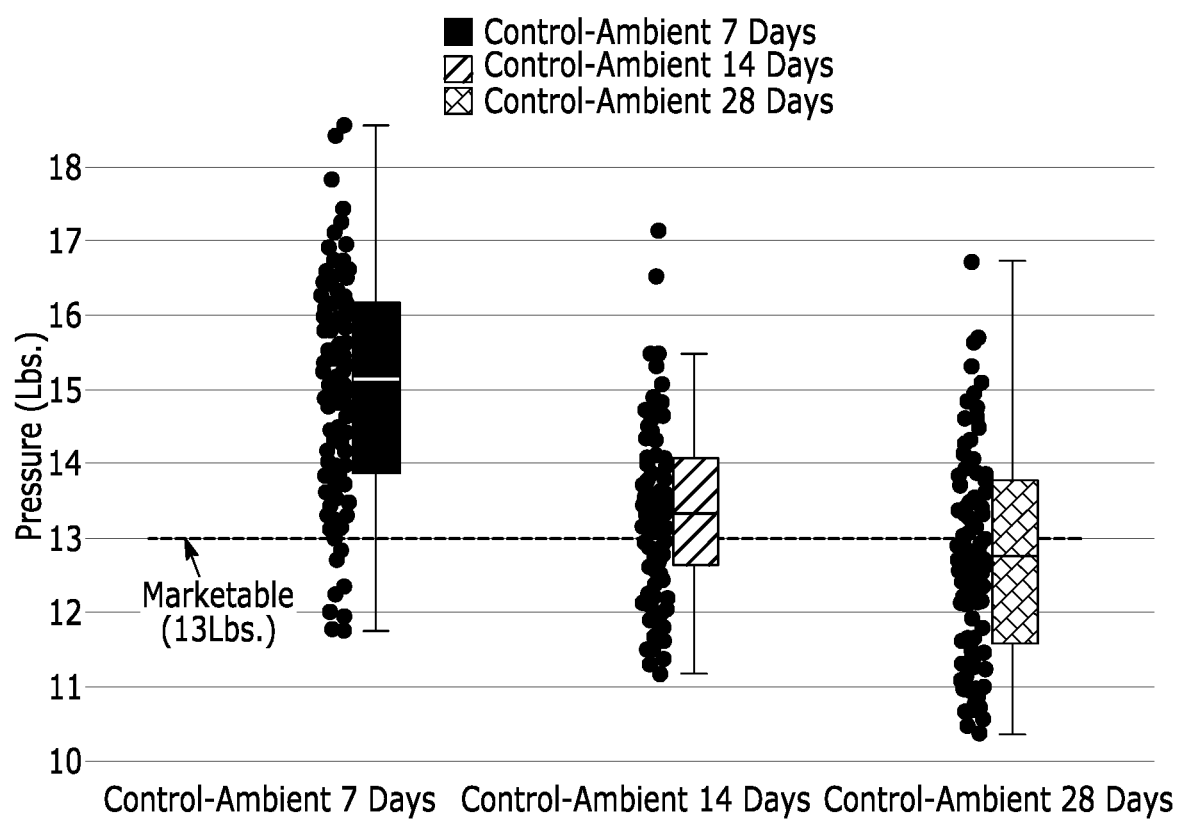
FIG. 11 shows the firmness of control apples after 7, 14, and 28 days at ambient temperature.

Photographs showing the microscopic appearance of the coating films prepared by Comparative Process 1, Comparative Process 2, and the inventive process are shown in FIG. 7, respectively. The photograph of the coating film prepared by Comparative Process 1, i.e. heating the starch composition to a temperature of 75° C., shows that the coating film primarily comprises swollen starch granules. The photograph of the coating film prepared by Comparative Process 2, i.e. heating the starch composition to a temperature of 100° C., shows that the coating is a plasticized film with no starch granules. The photograph of the coating film prepared in accordance with the present technology shows that the coating is a plasticized film containing starch granules.

Qualitative properties of the coating compositions and the resulting films were assessed, and the comparative results are shown in Table 4.

TABLE 4

|  | Comparative Process 1 | Comparative Process 2 | Inventive Process |
| --- | --- | --- | --- |
| Viscosity | Very high/gel | Low viscosity/liquid | Semi-viscous/liquid |
| Stability (remains liquid) | No | Yes | Yes |
| Sprayability | Not sprayable | Sprayable | Sprayable |
| Coverage/adhesion to surface | Very thick/hard to apply | Poor coverage on surface | Easy application/excellent coverage on surface |
| Sensory texture feel | Plastic feel | Sticky with plastic feel | Natural feeling |
| Film elasticity | Medium elasticity (can bend but creates creases) | Not elastic, brittle plasticity | High elasticity (bends easily without creasing) |
| Humidity resistant? | Stable | Peeled in cold conditions | Stable |

The results in Table 4 show that only the coating composition prepared according to the present technology provides both sprayability and stability of the liquid composition, and suitable adhesion and stability of the dried coating.

Example 5: Comparative Testing of Starch Coating v. Wax Coating

The marketability of apples has a few scientific indicators. The simplest measurement, amenable to both field-work and lab-work is the firmness test. The firmer the apple, the juicier and crispier it will taste. These characteristics are generally thought of as favorable. The softer the apple, the mealier the flesh is and it is also generally less flavorful. To do the firmness test, a penetrometer is used to determine the maximum force measured while punching into the flesh of the apple (having removed 2 mm of peel beforehand). The measurement is either in units of pounds, kilograms (2.205 pounds), or Newton (0.2248 pounds).

Apples coated with a starch coating prepared according to Example 1 were assessed for firmness and compared against apples coated with a standard wax coating as a control. The apples (Gala variety) were tested under two main storage conditions: starch coated and wax coated fruit stored at room temperature (ambient conditions), and starch coated and wax coated fruit stored in cold storage. The room temperature apples were tested after 7 days, 14 days, and 28 days for firmness (pounds). The cold storage apples were tested for firmness after 35 days and then again after 7 days at room temperature (35 Cold Storage+7 Days ambient to test the effect of thermal shock). Firmness was tested twice on each piece of fruit from each experimental condition batch. Candidate fruit for fresh market sales should have a firmness greater than 13 pounds. Gala apples must measure greater than 11 pounds in order to be shipped within the state of Washington (where most US apples are grown). The firmness test temperature conditions and number of samples for each batch are shown in Table 5.

TABLE 5

| Test Condition | # of Control Apples | # of Test Apples (starch coated) |
|---|---|---|
| 35 day cold storage | 50 | 50 |
| 35 day cold storage + 7 days ambient | 79 | 50 |
| 7 day ambient | 100 | 100 |
| 14 day ambient | 100 | 100 |
| 28 day ambient | 88 | 100 |

The results of the firmness testing are graphically shown in FIGS. 8-11. The graph in FIG. 8 shows the firmness test results for the Control and Test (starch coated) batches stored for 35 days in cold storage, and the graph in FIG. 9 show the firmness test results for the Control and Test batches stored for 35 days in cold storage plus 7 days at ambient temperature. The results demonstrate that the apples coated with the starch coating of the present technology had significantly better firmness after cold storage and cold storage plus ambient temperature than the control apples. The graph in FIG. 10 shows the firmness test results for the Test apples stored for 7, 14, and 28 days at ambient temperature. The results show that, even after 28 days, the majority of the apples coated with the starch coating of the present technology exceeded the 13 pound marketability threshold. The graph in FIG. 11 shows the firmness test results for the Control apples stored for 7, 14, and 28 days. These results show that, after 28 days, the majority of the Control apples failed to meet the 13 pound marketability threshold. A comparison of the results shown in FIG. 10 with those shown in FIG. 11, demonstrates that the starch coating of the present technology can extend the shelf-life of apples stored at ambient temperature.

Example 6: Oxygen Permeability

The oxygen permeability of a coating film of the present technology was measured according to ASTM method F1927. The test gas was 100% O2 at 50% Relative Humidity, at a gas pressure of 760 mm Hg and a gas temperature of 20° C. The carrier gas was 98% N2 and 2% H2 at 0% RH. The coating film had an oxygen permeability value of 1.04 cc/m2×day with a film thickness of 4.58 mils. This oxygen permeability value is comparable, given the same thickness, to ethyl vinyl alcohol (EVOH), a plastic commonly used in the food industry to block oxygen. Compared to a typical wax coating, the coating formulation of the present technology can block about 240 times more oxygen.

The present technology is now described in such full, clear, concise, and exact terms as to enable any person skilled in the art to which it pertains, to practice the same. It is to be understood that the foregoing describes preferred embodiments of the invention and that modifications may be made therein without departing from the spirit or scope of the invention as set forth in the appended claims.

The invention claimed is:

1. A method of applying a coating composition to a food product, the method comprising:

(a) providing a coating composition comprising (i) a liquid carrier; (ii) a polymerized starch comprising amylopectin chains and/or amylose chains dispersed in the liquid carrier; and (ii) starch granules dispersed in the liquid carrier;

(b) heating the coating composition to a temperature in the range of 45° C. to about 85° C. for a time sufficient to cause the starch granules to swell, but not rupture;

(c) spraying the coating composition through a spray-coating nozzle onto at least a portion of the food product; and (d) drying the coating composition applied to the food product to form a dried coating in which the amylopectin chains and/or amylose chains are intertwined to form a matrix, and the swollen starch granules are embedded in the matrix.

2. The method of claim 1, wherein the coating composition is introduced into the spray-coating nozzle by pumping.

3. A method of making a food product coating composition comprising the steps of:

(1) heating a slurry comprising starch granules and water to a temperature in the range of 70° C. to 125° C. for a time sufficient to rupture the starch granules and form a polymerized starch comprising amylopectin chains and/or amylose chains dispersed in the water;

(2) optionally, cooling the slurry; and (3) adding starch granules to the slurry comprising the polymerized starch and water, and heating the starch granules in the slurry to a temperature in the range of 45° C. to 85° C. for a time sufficient to cause the starch granules to swell, but not rupture, whereby a coating composition is formed in which the swollen starch granules are embedded in a matrix formed by the amylopectin chains and/or amylose chains of the polymerized starch.

4. The method of claim 3, wherein the slurry is cooled to a temperature of about 70° C.

5. The method of claim 3, wherein the coating composition further comprises at least one additional component selected from the group consisting of essential oils, surfactants, emulsifiers, plasticizers, anti-microbials, anti-oxidants, cross-linking agents, pigments, and combinations thereof.

6. The method of claim 5, wherein the at least one additional component is a cross-linking agent comprising citric acid.

7. The method of claim 6, wherein the citric acid is added to the slurry before heating the slurry and/or added during cooling of the slurry.

8. The method of claim 5, wherein the at least one additional component is a plasticizer comprising glycerin, aloe vera gel, or a combination thereof.

9. The method of claim 8, wherein the plasticizer is added to the slurry before heating the slurry and/or added during cooling of the slurry.

10. The method of claim 8, wherein the plasticizer is added to the starch granules before they are added to the slurry comprising polymerized starch and water.

11. The method of claim 5, wherein the at least one additional component is an essential oil comprising cinnamon oil.

12. The method of claim 11, wherein the essential oil is added to the starch granules before they are added to the slurry comprising polymerized starch and water.

13. A method of making a food product coating composition comprising a starch component and water, the method comprising the steps of:

(1) heating a slurry comprising starch granules and water to a temperature in the range of 70° C. to 125° C. for a time sufficient to rupture the starch granules and form a polymerized starch comprising amylopectin chains and/or amylose chains dispersed in the water;

(2) heating starch granules in a liquid to a temperature in the range of 45° C. to 85° C. for a time sufficient to cause said liquid to enter the starch granules and disrupt their semi-crystalline structure such that the starch granules are swollen but not ruptured; and (3) mixing the swollen starch granules with the slurry comprising the polymerized starch and water to form a coating composition in which the swollen starch granules are embedded in a matrix formed by the amylopectin chains and/or amylose chains of the polymerized starch;

wherein the polymerized starch is a majority of the starch component.

14. The method of claim 13, wherein the coating composition further comprises at least one additional component selected from the group consisting of essential oils, surfactants, emulsifiers, plasticizers, anti-microbials, anti-oxidants, cross-linking agents, pigments, and combinations thereof.

15. The method of claim 14, wherein the at least one additional component is a cross-linking agent comprising citric acid.

16. The method of claim 14, wherein the at least one additional component is a plasticizer comprising glycerin, aloe vera gel, or a combination thereof.

17. The method of claim 14, wherein the at least one additional component is an essential oil comprising cinnamon oil.

* * * * *